Patented Apr. 17, 1951

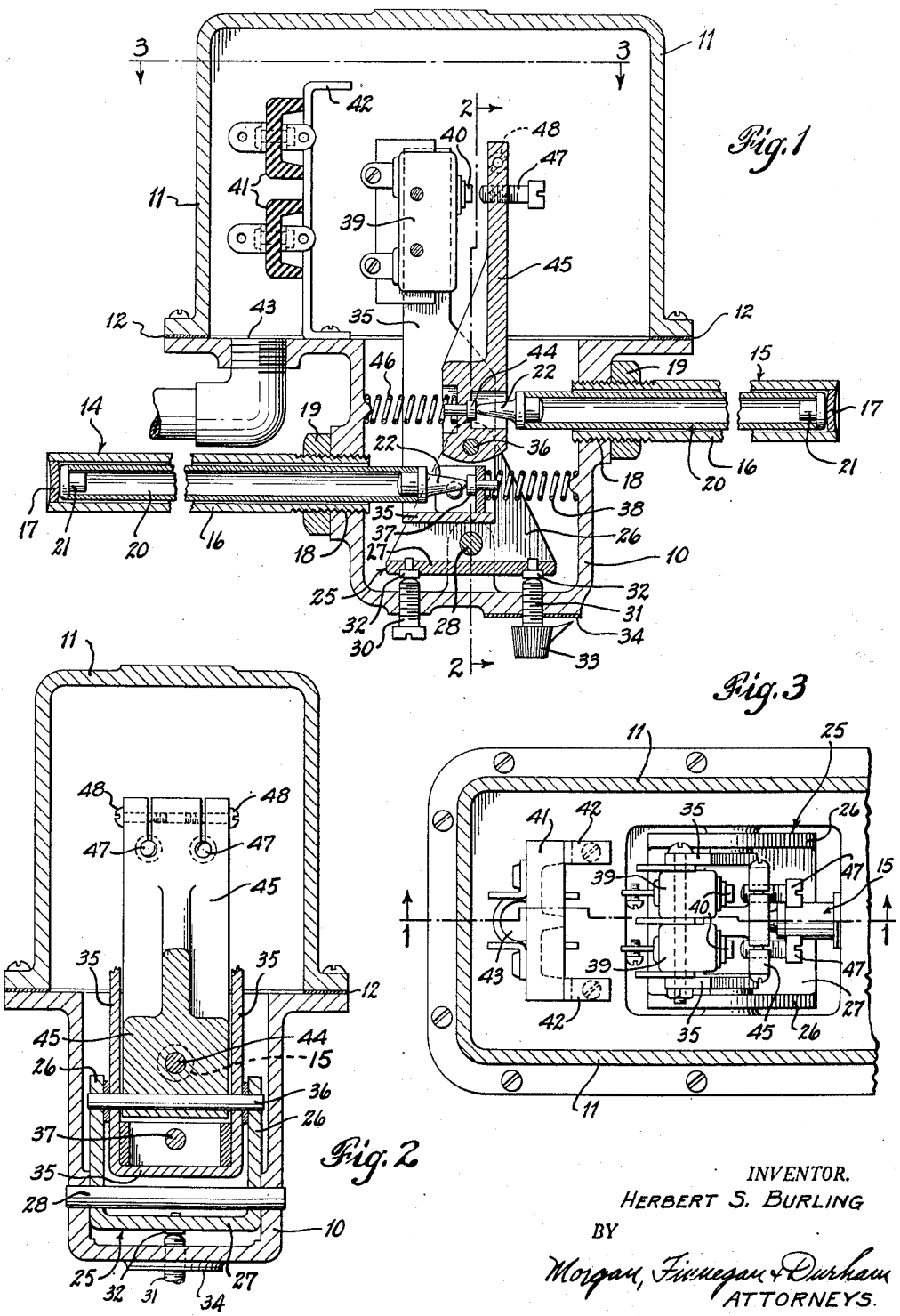

2,549,054

UNITED STATES PATENT OFFICE 2,549,054

DIFFERENTIAL TEMPERATURE CONTROL SWITCH

Herbert S. Burling, South Orange, N. J.

Application September 21, 1949, Serial No. 117,044

14 Claims. (Cl. 200—137)

1

The present invention relates to improvements in mechanisms adapted to control temperatures, and more particularly to such mechanisms which are adapted to respond and operate in accordance with given differentials in temperature.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate an embodiment of the invention, and together with the description, serve to explain the principles of the invention.

Of the drawings:

Fig. 1 is a cross-sectional view of a typical and illustrative embodiment of the invention, said section being taken along line 1—1 of Fig. 3;

Fig. 2 is a cross-sectional view taken along line 2—2 of Fig. 1; and,

Fig. 3 is a view partly in section and partly in plan, as taken along line 3—3 of Fig. 1.

The invention has for an object the provision of an improved temperature control mechanism of the differential type, that is, one which is capacitated to operate in accordance with the existence of a temperature difference between two areas, and may be utilized to control heat input or output mechanism for maintaining a predetermined temperature differential between such areas. The invention provides a relatively simple and sturdy differential temperature control mechanism which is at the same time extremely sensitive in reaction and reliable in operation. The invention further provides a control mechanism which may be conveniently adjusted, and may be utilized for the control of heat for the maintenance of a wide range of temperature differentials. With these and other objects in view there are provided in the illustrative embodiment of the invention herein shown a pair of temperature responsive devices adapted to be located in separate areas or zones between which it is desired to maintain a predetermined temperature differential. Said temperature responsive devices are adapted to engage and move respective ones of a pair of levers which are mounted for pivotal movement about a common axis. One such lever carries one or more switches or the like used to control heat input or outtake means, and the other such lever carries preferably adjustable means for engagement with and actuation of the switches. Both levers are mounted on a third lever which is pivotally mounted with respect to a stationary casing within which the levers and switches are preferably mounted and to which the temperature responsive means are held. Adjusting means exteriorly of the casing are provided for varying the rotational position of said third lever on its axis, whereby the relative positions of the first two levers may be varied, and the setting of the temperature difference to be maintained may be conveniently set.

It will be understood that the foregoing general description and the following detailed description as well are exemplary and explanatory of the invention but are not restrictive thereof.

Referring now in detail to the embodiment of the invention shown by way of example in the accompanying drawings, there is provided a lower casing portion 10 which may be a casting in the form shown serving as a substantial base upon which the moving parts of the mechanism are mounted, and an upper or cover casing portion 11 is removably secured to portion 10 with an interposed sealing gasket 12, the two portions forming a complete casing protection for the parts of the differential temperature control mechanism. A pair of temperature responsive elements designated generally 14 and 15 are provided one on either side of casing portion 10 and axially offset or in unopposed relationship to each other. Said elements 14 and 15 may be of any type which will suitably react to variations in temperatures to bring about movement in the lever mechanism hereinafter described. As shown in the drawings the elements are of conventional construction each comprising an outer tube 16 closed at one end by an end piece 17 and provided at the other end with threads to engage a threaded aperture 18 in casing portion 10 whereby said tube may be inserted more or less into the casing portion and fixedly held therein by means of jam nuts 19. A second tube 20 is provided for each temperature responsive element positioned within the first tube 16, having at one end a hardened bearing pin 21 to abut the end cover 17 and at the other end a hardened, pointed contact piece 22 for engagement with the respective lever. The member 20 could be, of course, and frequently is, provided in such devices in the form of a rod. In accordance with conventional practice each outer tube 16 is made of material having a relatively high coefficient of expansion and each inner tube is made of material having a relatively low coefficient of expansion, whereby changes in temperature of the zone in which the element may be positioned will result in axial movement of the hardened contact piece 22, said piece being carried in one direction by abutment of tubes 16 and 20 at bearing portions 17 and 21, and being spring pressed in the opposite direction as hereinafter described.

The means for actuating control switches from temperature induced movements of said elements 14 and 15 comprise a rocking lever 25 which, as shown in Figs. 1 and 2, comprises a pair of opposed, triangularly shaped arms 26 joined by a base portion 27, said lever being pivotally mounted by means of a pin 28 extending through the walls of casing portion 10 and arms 26. The rotational position of rocking lever 25 on its axis may be varied and fixed by means of set screws 30 and 31 threadedly engaged through the wall of the casing with hardened contact pins 32 on base portion 27 of the lever, and one of said screws as 31 for instance may be provided with an indicator knob 33 to cooperate with a calibrated dial 34 to indicate the relative position of the rocking lever.

Movements of contact piece 22 of the temperature responsive element 14 are translated to a switch lever 35 which is pivotally mounted as shown by a shaft 36 extending between and carried by the arms 26 of rocking lever 25. The end of switch lever 35 below its pivotal axis (as viewed in the drawings) is provided with a hardened bearing piece 37 to be engaged by contact piece 22, and a coiled spring 38 between the lever and a wall of casing portion 10 causes the lever to follow axial movements of contact piece 22. One or more switches 39 (two in the embodiment of the invention herein shown) are carried at the other or upper end of lever 35, said switches having buttons 40 to be depressed in their actuation. Insulated brackets 41 are provided on an arm 42 secured to casing portion 10 to support lead wires (not shown) for the switches entering the casing through an access opening 43.

The other temperature responsive element 15 through its contact piece 22 engages a hardened bearing piece 44 on an adjusting lever 45 which is also pivotally mounted, at its lower end, by means of shaft 36 upon the rocking lever 25. The engagement points at pieces 37 and 44 of the elements 14 and 15 with their respective levers 35 and 45 are preferably spaced equal distances from their common axis about shaft 36 as such construction makes operation of the control uniform, but different distances could be incorporated whereby a fixed differential would be introduced into the operation of the control. A coiled spring 46 substantially identical to spring 38 is positioned between lever 45 and a wall of casing portion 10, exerting the same force on said lever as spring 38 exerts on lever 35.

Adjacent the end of adjusting lever 45 are positioned screws 47 (one for each switch 39 which may be carried by lever 35) extending through the lever to have an adjustable engagement with the actuating buttons 40 of the switches. As shown in detail in Fig. 2, the end of lever 45 is relieved at places corresponding with the positions of engagement screws 47, and set screws 48 are provided whereby the screws 47 may be easily adjusted to vary their operative distance with respect to buttons 40, and may be firmly held in a given position.

The operation of the described control mechanism will be first described assuming that an on and off control is desired for a heat source to maintain a predetermined temperature differential between two zones, which might be outside a building and an internal heating duct, or two vessels or containers, or the like. For such operation only one switch 39 is needed, and this will preferably be a normally open, snap action switch suitably wired in the operating circuit of a heat supply valve or the like. The control instrument is first adjusted in a room where the heat responsive elements 14 and 15 will be exposed to the same temperature, and the exterior tube 16 of each element is screwed in or out of casing portion 10 until levers 35 and 45 are so positioned that an adjusting screw 47 is just about to actuate its switch, whereafter the exterior tubes may be secured in position by nuts 19.

The instrument is then placed in its operating position with each of the elements 14 and 15 in a respective area or zone, and for purposes of illustration it may be assumed that the element 15 is placed in a zone of higher temperature and element 14 in one of lower temperature, and it is desired to maintain a differential of 40°, for instance, between the two zones. The instrument may be adjusted for the maintainence of such differential either by screwing in the adjusting screw 47 in lever 45, or by mainpulation of screws 30 and 31 to allow a rotation of rocking lever 25 about axis 28 in a clockwise direction, which moves together the ends of levers 35 and 45 carrying the switch 39 and contact screw 47 respectively. Such adjustment is preferably made on the screws 30 and 31 as they are more accessible and the calibrated dial 34 may indicate the rotation necessary for a given temperature differential.

By this adjustment, and assuming the temperature of element 15 is less than 40° higher than that of element 14, switch 39 is closed and additional heat will be furnished to the zone of element 15. When the 40° temperature differential has been achieved, expansion of tube 16 allows lever 45 to rotate in a clockwise direction, disengaging screw 47 from button 40 allowing the switch to open and cutting off further heat supply to the zone of element 15. When the temperature in such zone drops, tube 16 contracts and the operation of lever 45 is reversed. If the temperature in the zone surrounding element 14 drops, its tube 16 contracts resulting in a counterclockwise rotation of lever 35, and switch 39 is carried away from screw 47, whereby the temperature of element 15 is allowed to drop to the point of the 40° differential before the switch 39 is again operated. If the temperature of element 14 is raised the action is the reverse, switch 39 being carried toward the screw 47 to close the switch, whereby heat is supplied until the 40° differential has been again attained and screw 47 is moved out of contact with button 40.

Utilizing both of the switches 39 as shown in the embodiment of the invention described, one such switch may be connected to operate a heat valve, damper or the like in one direction, with the other to operate it in the opposite direction, and by the adjusting screws 47 there may be set a dead or neutral temperature zone between operation of the switches.

The invention in its broader aspects is not limited to the specific mechanisms shown and described but departures may be made therefrom, within the scope of the accompanying claims, without departing from the principles of

What I claim is:

1. In a mechanism for the differential control of temperatures in separate temperature zones, in combination, a pair of temperature actuated elements, a pivotally mounted rocking lever, a switch lever and a switch controlling lever both mounted for pivotal movement about a common axis on said rocking lever, each of said elements being operatively associated with a respective one of said switch and switch controlling levers for imparting motion thereto about said common axis upon temperature induced actuation of said elements.

2. In a mechanism for the differential control of temperatures in separate temperature zones, in combination, a pair of temperature actuated elements, a pivotally mounted rocking lever, a switch lever and a switch controlling lever both mounted for pivotal movement about a common axis on said rocking lever, each of said elements being operatively associated with a respective one of said switch and switch controlling levers for imparting motion thereto about said common axis upon temperature induced actuation of said elements, and means for varying and fixing the rotational position of said rocking lever on its axis.

3. In a mechanism for the differential control of temperatures in separate temperature zones, in combination, a pair of temperature actuated elements, a pivotally mounted rocking lever, a switch lever and a switch controlling lever both mounted for pivotal movement about a common axis on said rocking lever, each of said elements being operatively associated with a respective one of said switch and switch controlling levers for imparting motion thereto about said common axis upon temperature induced actuation of said elements, said elements exerting force on their respective levers at opposite sides of said common axis.

4. In a mechanism for the differential control of temperatures in separate temperature zones, in combination, a pair of temperature actuated elements, a pivotally mounted rocking lever, a switch lever and a switch controlling lever both mounted for pivotal movement about a common axis on said rocking lever, each of said elements being operatively associated with a respective one of said switch and switch controlling levers for imparting motion thereto about said common axis upon temperature induced actuation of said elements, said elements exerting force on their respective levers at opposite sides of said common axis and at substantially equal distances therefrom.

5. In a mechanism for the differential control of temperatures in separate temperature zones, in combination, a pair of temperature actuated elements, a pivotally mounted rocking lever, a switch lever and a switch controlling lever both mounted for pivotal movement about a common axis on said rocking lever, each of said elements being operatively associated with a respective one of said switch and switch controlling levers for imparting motion thereto about said common axis upon temperature induced actuation of said elements, said elements exerting force on their respective levers at opposite sides of said common axis and at substantially equal distances therefrom and spring means for each of said switch and switch controlling levers exerting a substantially equal force on said levers in opposition to said elements.

6. In a mechanism for the differential control of temperatures in separate temperature zones, in combination, a pair of temperature actuated elements, a pivotally mounted rocking lever, a switch lever and a switch controlling lever both mounted for pivotal movement about a common axis on said rocking lever, each of said elements being operatively associated with a respective one of said switch and switch controlling levers for imparting motion thereto about said common axis upon temperature induced actuation of said elements, said elements exerting force on their respective levers at points on opposite sides of said common axis, said points of force application and the axes of said three levers being positioned substantially in a straight line.

7. In a mechanism for the differential control of temperatures in separate temperature zones, in combination, a pair of temperature actuated elements, a pivotally mounted rocking lever, a switch lever and a switch controlling lever both mounted for pivotal movement about a common axis on said rocking lever, each of said elements being operatively associated with a respective one of said switch and switch controlling levers for imparting motion thereto about said common axis upon temperature induced actuation of said elements, said elements exerting force on their respective levers at points on opposite sides of said common axis one of said points of force application being positioned between the axes of said rocking lever and said other levers.

8. In a mechanism for the differential control of temperatures in separate temperature zones, in combination, a stationary frame portion, a pair of temperature actuated elements secured to said portion and having parts moved by temperature changes, a rocking lever pivotally mounted on said portion, a switch lever and a switch controlling lever both mounted for pivotal movement about a common axis on said rocking lever, said parts of said elements engaging respective ones of said switch and switch controlling levers.

9. In a mechanism for the differential control of temperatures in separate temperature zones, in combination, a stationary frame portion, a pair of temperature actuated elements secured to said portion and having parts moved by temperature changes, said parts moving in opposite directions upon like temperature changes, a rocking lever pivotally mounted on said portion, a switch lever and a switch controlling lever both mounted for pivotal movement about a common axis on said rocking lever, said parts of said elements engaging respective ones of said switch and switch controlling levers at points on opposite sides of said common axis.

10. In a mechanism for the differential control of temperatures in separate temperature zones, in combination, a stationary frame portion, a pair of temperature actuated elements secured to said portion and having parts moved by temperature changes, said parts moving in opposite directions upon like temperature changes, a rocking lever pivotally mounted on said portion, a switch lever and a switch controlling lever both mounted for pivotal movement about a common axis on said rocking lever, said parts of said elements engaging respective ones of said switch and switch controlling levers at points on opposite sides of said common axis, and means adjustably secured on said frame portion engaging said rocking lever for varying and fixing the rotational position of said rocking lever on its axis.

11. In a mechanism for the differential control of temperatures in separate temperature zones, in combination, a pair of temperature actuated elements, a switch lever and a switch controlling lever mounted for pivotal movement about a common axis, each of said elements being operatively associated with a respective one of said switch and switch controlling levers for imparting motion thereto about said common axis upon temperature induced actuation of said elements, and movable mounting means for said common axis whereby said axis may be radially displaced.

12. In a mechanism for the differential control of temperatures in separate temperature zones, in combination, a pair of temperature actuated elements, a switch lever and a switch controlling lever mounted for pivotal movement about a common axis, each of said elements being operatively associated with a respective one of said switch and switch controlling levers for imparting motion thereto about said common axis upon temperature induced actuation of said elements, said elements exerting force on their respective levers at opposite sides of said common axis, and movable mounting means for said common axis whereby said axis may be radially displaced.

13. In a mechanism for the differential control of temperatures in separate temperature zones, in combination, a pair of temperature actuated elements, a switch lever and a switch controlling lever mounted for pivotal movement about a common axis, each of said elements being operatively associated with a respective one of said switch and switch controlling levers for imparting motion thereto about said common axis upon temperature induced actuation of said elements and at substantially equal distances therefrom, and movable mounting means for said common axis whereby said axis may be radially displaced.

14. In a mechanism for the differential control of temperatures in separate temperature zones, in combination, a pair of temperature actuated elements, a switch lever and a switch controlling lever mounted for pivotal movement about a common axis, each of said elements being operatively associated with a respective one of said switch and switch controlling levers for imparting motion thereto about said common axis upon temperature induced actuation of said elements, said elements exerting force oppositely directed with respect to each other on their respective levers, and movable mounting means for said common axis whereby said axis may be radially displaced.

HERBERT S. BURLING.

REFERENCES CITED

The following references are of record in the file of this patent:

UNITED STATES PATENTS

| Number | Name | Date |
| --- | --- | --- |
| 2,063,613 | McCarthy | Dec. 8, 1936 |
| 2,114,965 | Miller | Apr. 19, 1938 |

FOREIGN PATENTS

| Number | Country | Date |
| --- | --- | --- |
| 318,699 | Great Britain | Sept. 12, 1929 |
| 797,375 | France | Feb. 8, 1936 |